United States Patent [19]

Dietrich

[11] Patent Number: 4,489,928

[45] Date of Patent: Dec. 25, 1984

[54] VISE HAVING ADJUSTABLE FEATURES

[76] Inventor: Otto E. Dietrich, 617 W. Jackson St., Morton, Ill. 61550

[21] Appl. No.: 418,683

[22] Filed: Sep. 16, 1982

[51] Int. Cl.[3] .................... B23Q 3/02

[52] U.S. Cl. .................... 269/251; 269/246; 269/266

[58] Field of Search .............. 269/266, 240, 246, 244, 269/247, 250, 251, 252

[56] References Cited

U.S. PATENT DOCUMENTS

| | | | |
|---|---|---|---|
| 1,120,466 | 12/1914 | Fegley et al. | 269/251 |
| 2,205,674 | 6/1940 | Schroeder | 269/247 |
| 3,384,363 | 5/1968 | Wermuth et al. | 269/247 |
| 3,643,937 | 2/1972 | Russ | 269/251 |
| 3,788,635 | 1/1974 | Nelson | 269/244 |
| 4,043,547 | 8/1977 | Glomb et al. | 269/244 |
| 4,221,369 | 9/1980 | Takasugi | 269/250 |

FOREIGN PATENT DOCUMENTS

| | | | |
|---|---|---|---|
| 30513 | of 1897 | United Kingdom | 269/266 |

*Primary Examiner*—Robert C. Watson
*Attorney, Agent, or Firm*—James R. Bell

[57] ABSTRACT

A vise has an adjustable feature including a pair of adjustable members extending from a movable jaw toward another jaw. The adjustable members are movable independently of each other and independently of the movable jaw and permit clamping of uneven pieces or clamping of a piece off center between the jaws. Another adjustable feature permits the movable jaw to be held down during clamping operations.

1 Claim, 7 Drawing Figures

VISE HAVING ADJUSTABLE FEATURES

BACKGROUND OF THE INVENTION

1. Field of the Invention

This invention relates generally to a vise or clamping device and more particularly to adjustable features relating thereto.

2. Description of the Prior Art

A limitation of presently known vises is that sometimes it is desirable to clamp an uneven piece between the jaws or it may be desirable to clamp a work piece off center between the jaws. In such an instance, uneven forces are applied to the jaws and they have a tendency to spring. Another limitation is that the movable one of the vise jaws will raise up under some circumstances during clamping.

The foregoing illustrates limitations of the known prior art. Thus, it is apparent that it would be advantageous to provide an alternative directed to overcoming one or more of the limitations as set forth above. Accordingly, a suitable alternative is provided including features more fully disclosed hereinafter.

SUMMARY OF THE INVENTION

In one aspect of the present invention, this is accomplished by providing a clamping apparatus including a base and first and second jaws. The second jaw is movably connected to the base. A pair of adjustable members are carried by the second jaw and are extendable therefrom toward the first jaw. The adjustable members are independently adjustable relative to each other and relative to the second jaw. A device is provided for adjustably connecting the second jaw and the base. The device is carried by the second jaw engaged with a plate adjacent the base.

The foregoing and other aspects will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
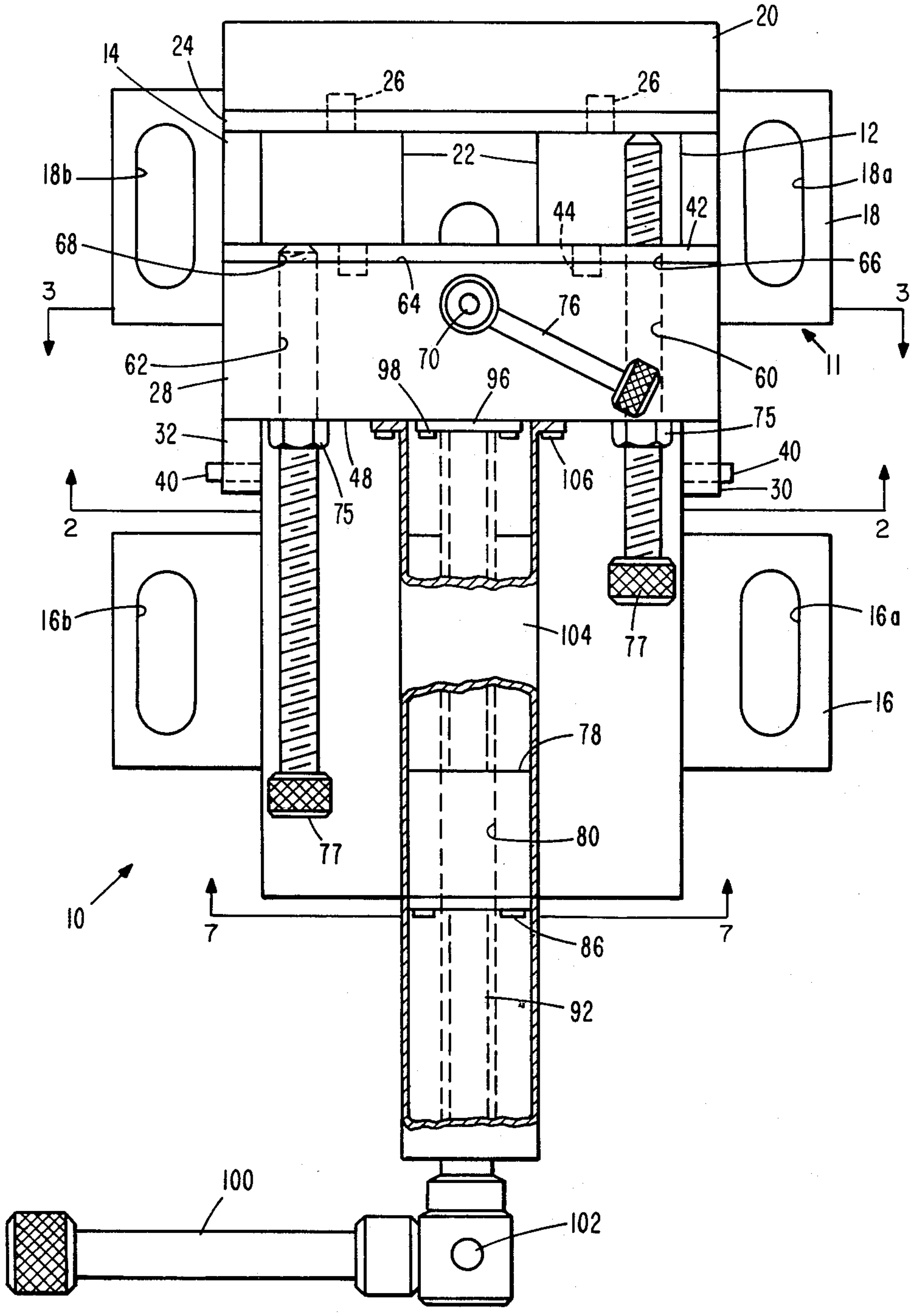
FIG. 1 is a plan view illustrating an embodiment of this invention.
Figure 2:
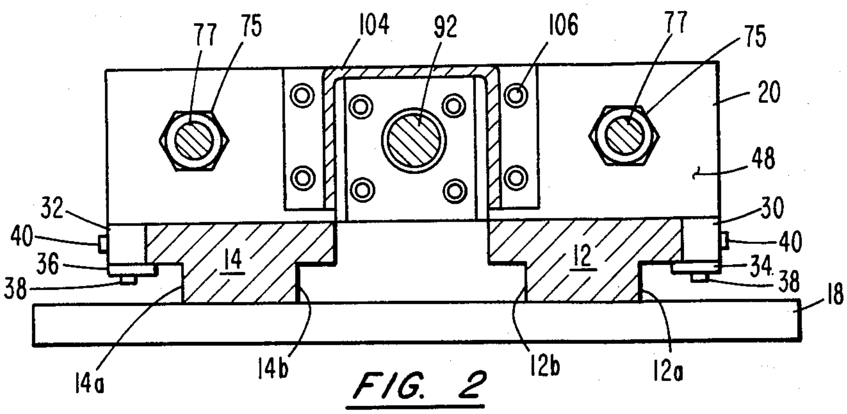
FIG. 2 is a view taken along line 2—2 of FIG. 1.
Figure 3:
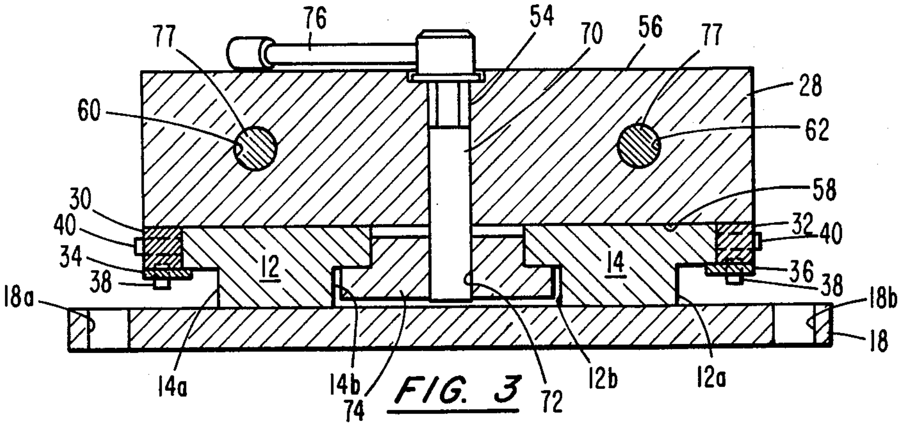
FIG. 3 is a view taken along line 3—3 of FIG. 1.
Figure 4:
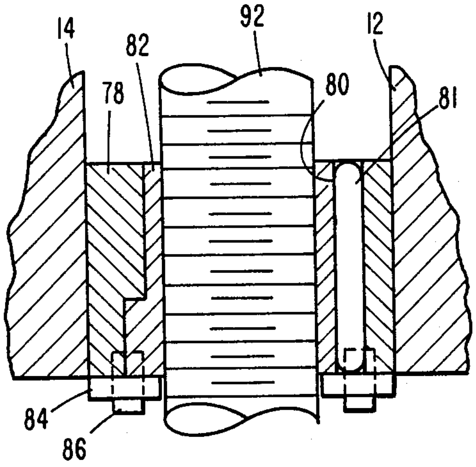
FIG. 4 is an exploded partial plan view, cut-away to illustrate an embodiment of the holder block of this invention.
Figure 5:
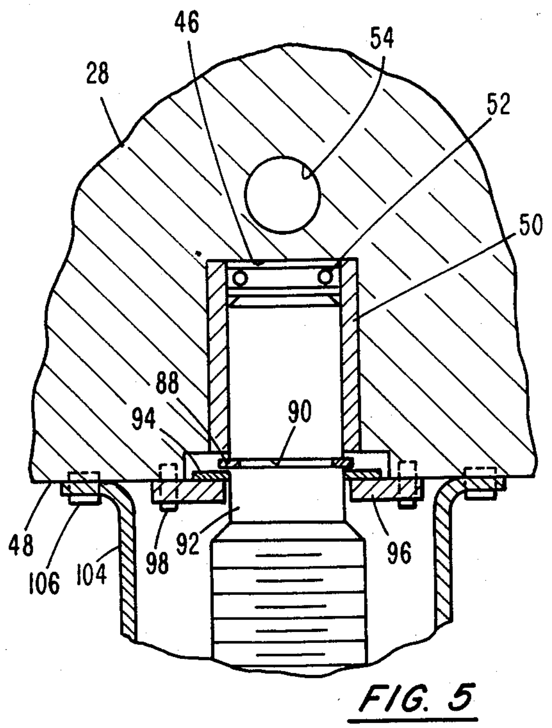
FIG. 5 is an exploded partial plan view, cut-away to illustrate an embodiment of the screw connection to the movable jaw of this invention.
Figure 6:
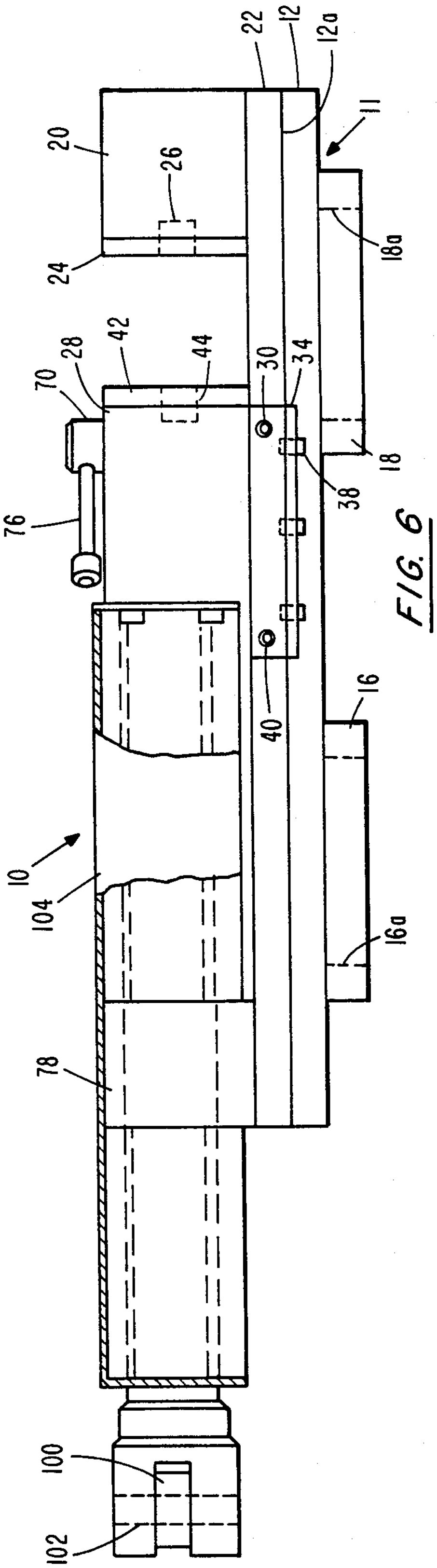
FIG. 6 is a cross-sectional side elevation partially cut-away to illustrate an embodiment of this invention.
Figure 7:
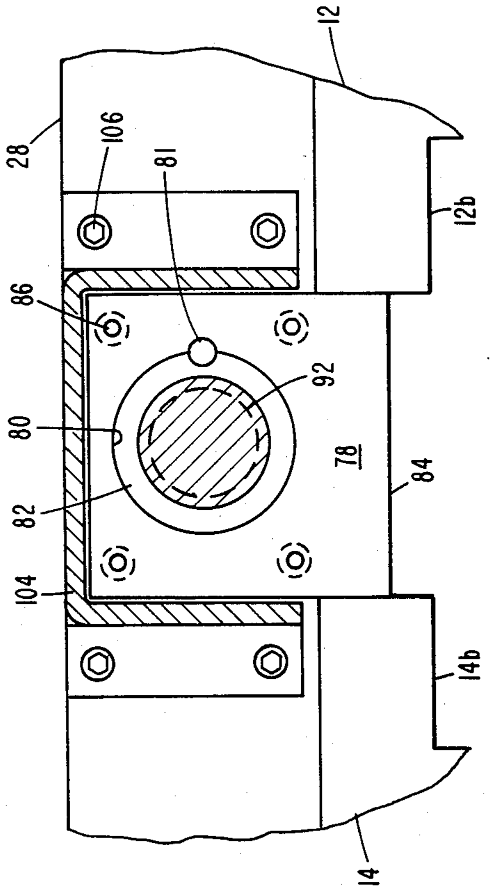
FIG. 7 is an end view illustrating an embodiment of the screw cover of this invention taken along line 7—7 of FIG. 1.

An embodiment of the vise of this invention is generally designated 10 in the drawing figures. A base 11 includes a pair of substantially elongated, parallel tracks 12, 14 preferably welded to a pair of transversely disposed, substantially elongated, parallel attachment plates 16, 18. Tracks 12, 14 include a "T" shaped cross-section. As a result, track 12 includes a pair of elongated guide grooves 12*a, b* and track 14 includes a similar pair of elongated grooves 14*a, b*. Although attachment plates 16, 18 are connected by welding to tracks 12, 14, other means of attachment may be suitable. Attachment plate 16 includes a pair of elongated slots 16*a, b,* formed therein of a construction sufficient for receiving bolts therethrough for the purpose of attaching base 11 to an associated support table. Similarly, plate 18 includes slots 18*a, b*.

A first jaw 20 is welded to one end 22 of tracks 12, 14. A jaw plate 24 is attached to jaw 20 by hex head socket screws 26 so that jaw plate 24 is removable and replaceable.

A second jaw 28 is movably connected to tracks 12, 14 by a pair of plates 30, 32 preferably welded to opposite ends of jaw 28. A flange plate 34, 36 is removably attached to each plate 30, 32 respectively by a plurality of hex head socket screws 38. Flange plates 34, 36 extend into grooves 12*a*, 14*a*, respectively, for retaining second jaw 28 in sliding engagement with tracks 12, 14. Preferably, a plurality of hex head socket screws 40 are threaded through plates 30, 32 and are adjustable into and out of engagement with jaw 28, thus functioning to take up wear which may occur between jaw 28 and tracks 12, 14. A jaw plate 42 is attached to jaw 28 by hex head socket screws 44 so that jaw plate 42 is removable and replaceable.

A blind bore 46 is provided in a face 48 of jaw 28 and extends into jaw 28. A bronze bushing 50 and a thrust bearing 52 are seated in bore 46. A bore 54 extends through faces 56, 58 of jaw 28. A pair of threaded bores 60, 62 extend through faces 48, 64 of jaw 28 and aligned threaded bores 66, 68 extend through jaw plate 42.

A threaded member 70 extends through bore 54 and is received by a threaded aperture 72 in a hold down plate 74 which is of an inverted "T" shaped cross-section for engaging grooves 12*b*, 14*b*. A handle 76 is connected for rotating threaded member 70 and drawing plate 74 into and out of engagement with tracks 12, 14 for the purpose of holding down movable jaw 28 when necessary to prevent jaw 28 from raising up slightly during use. A pair of screws 77 extend through bores 60, 62, 66, 68 and can be independently adjusted to extend a desired distance beyond jaw plate 42 for limiting jaw 28 from springing when clamping an uneven sized piece of work or clamping a piece off center between jaw plates 24, 42. A nut 75 is received on each screw 77 for engagement with face 48 so as to secure screw 77 in a desired position.

A screw holder block 78 is welded to tracks 12, 14 and includes a through bore 80 aligned with blind bore 46. A bronze nut 82 is seated in bore 80 and a taper pin 81 is inserted between bore 80 and nut 82 to limit rotation of nut 82. A removable retaining plate 84 is attached to block 78 by a plurality of hex head socket screws 86.

An elongated screw 92 is threaded through nut 82 and is recessed in blind bore 46. A snap ring 88 in a groove 90 of screw 92 cooperates with a washer 94 and a cover plate 96 for retaining screw 92 in bore 46. A plurality of hex head socket screws 98 retain plate 96 on jaw 28. A handle 100 is pivotally connected to screw 92 via a pin 102 for rotating screw 92 in bronze nut 82 thus moving jaw 28 toward and away from jaw 20 as guided by tracks 12, 14.

A removable cover plate 104 is provided for attachment to face 48 of jaw 28 by a plurality of hex head socket screws 106. Plate 104 is of a construction sufficient to extend between face 48 of jaw 28 and handle 100 and to slide over block 78 as screw 92 is rotated.

Unless otherwise stated, all parts of vise 10 are made from stock steel of standard sizes which can be cut to a desired size and welded together.

The foregoing has described a vise having an adjustable feature extendible from the first jaw toward the second jaw to permit uneven pieces to be clamped between the jaws or to permit a piece to be clamped only on one side of the jaws. Another adjustable feature is provided to hold down the movable jaw during clamping operations.

It is anticipated that aspects of the present invention, other than those specifically defined in the appended claims, can be obtained from the foreoing description and the drawings.

Having thus described the invention, what is claimed is:

1. A clamping apparatus comprising:

a base including a pair of tracks having grooves formed therein;

a first jaw connected to said base;

a second jaw movably connected to said base;

means connected to said second jaw for moving said second jaw toward and away from said first jaw;

means interconnecting said second jaw and said base for guiding movement of said second jaw, said interconnecting means being removably connected with said second jaw and extending into ones of said grooves;

a pair of adjustable members carried by said second jaw and extendible therefrom toward said first jaw, said adjustable members each being independently adjustable relative to each other and relative to said second jaw;

means for securing said adjustable members in position relative to said second jaw;

means for securing said second jaw to said base, said means being carried by said second jaw and including a handle and a threaded member in said second jaw engaged with a plate slidably mounted with others of said grooves;

a plurality of opposed wear take-up members connected to said second jaw and engaging said tracks; and a cover plate removably connected to said movable jaw.

* * * * *